US011873012B2

(12) United States Patent
Malla et al.

(10) Patent No.: US 11,873,012 B2
(45) Date of Patent: Jan. 16, 2024

(54) SYSTEM AND METHOD FOR PROVIDING SOCIAL-STAGE SPATIO-TEMPORAL MULTI-MODAL FUTURE FORECASTING

(71) Applicant: Honda Motor Co., Ltd., Tokyo (JP)

(72) Inventors: Srikanth Malla, Sunnyvale, CA (US); Chiho Choi, San Jose, CA (US); Behzad Dariush, San Ramon, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 224 days.

(21) Appl. No.: 17/160,747

(22) Filed: Jan. 28, 2021

(65) Prior Publication Data
US 2022/0017122 A1   Jan. 20, 2022

Related U.S. Application Data

(60) Provisional application No. 63/053,394, filed on Jul. 17, 2020.

(51) Int. Cl.
*B60W 60/00* (2020.01)
*G06N 3/049* (2023.01)

(52) U.S. Cl.
CPC .......... *B60W 60/00272* (2020.02); *B60W 60/00274* (2020.02); *G06N 3/049* (2013.01); *B60W 2420/42* (2013.01); *B60W 2420/52* (2013.01)

(58) Field of Classification Search
None
See application file for complete search history.

(56) References Cited

U.S. PATENT DOCUMENTS

| 9,248,834 | B1 * | 2/2016 | Ferguson | B60W 60/0027 |
| 11,195,418 | B1 * | 12/2021 | Hong | G06N 3/0454 |
| 2018/0124423 | A1 * | 5/2018 | Choi | G08B 13/00 |
| 2020/0089246 | A1 * | 3/2020 | McGill, Jr. | G05D 1/0088 |

(Continued)

FOREIGN PATENT DOCUMENTS

WO   WO-2020114780 A1 *  6/2020

OTHER PUBLICATIONS

A. Alahi, K. Goel, V. Ramanathan, A. Robicquet, L. Fei-Fei, and S. Savarese. Social lstm: Human trajectory prediction in crowded spaces. In Proceedings of the IEEE conference on computer vision and pattern recognition, pp. 961-971, 2016.

(Continued)

*Primary Examiner* — James J Lee
*Assistant Examiner* — Tawri M McAndrews
(74) *Attorney, Agent, or Firm* — RANKIN, HILL & CLARK LLP

(57) ABSTRACT

A system and method for providing social-stage spatio-temporal multi-modal future forecasting that include receiving environment data associated with a surrounding environment of an ego vehicle and implementing graph convolutions to obtain attention weights that are respectively associated with agents that are located within the surrounding environment. The system and method also include decoding multi modal trajectories and probabilities for each of the agents. The system and method further include controlling at least one vehicle system of the ego vehicle based on predicted trajectories associated with each of the agents and the rankings associated with probabilities that are associated with each of the predicted trajectories.

17 Claims, 7 Drawing Sheets

(56) References Cited

U.S. PATENT DOCUMENTS

| | | | |
|---|---|---|---|
| 2020/0117958 A1* | 4/2020 | Brown | G06N 3/08 |
| 2021/0150230 A1* | 5/2021 | Smolyanskiy | G06V 10/803 |
| 2021/0248460 A1* | 8/2021 | Sykora | G06N 3/08 |
| 2021/0253131 A1* | 8/2021 | Sen | G01S 17/58 |
| 2021/0261167 A1* | 8/2021 | Kum | G06V 10/764 |

OTHER PUBLICATIONS

A. Bhattacharyya, M. Fritz, and B. Schiele. Long-term on-board prediction of people in traffic scenes under uncertainty. In Proceedings of the IEEE Conference on Computer Vision and Pattern Recognition, pp. 4194-4202, 2018.

Y. Chai, B. Sapp, M. Bansal, and D. Anguelov. Multipath: Multiple probabilistic anchor trajectory hypotheses for behavior prediction. In Conference on Robot Learning, pp. 86-99, 2019.

C. Choi. Shared cross-modal trajectory prediction for autonomous driving. arXiv preprint arXiv:2004.00202, 2020, J. H. Choi, J. Li, S. Malla.

H. Cui, V. Radosavljevic, F.-C. Chou, T.-H. Lin, T. Nguyen, T.-K. Huang, J. Schneider, and N. Djuric. Multimodal trajectory predictions for autonomous driving using deep convolutional networks. In 2019 International Conference on Robotics and Automation (ICRA), pp. 2090-2096. IEEE, 2019.

J. Curro and J. Raquet. Deriving confidence from artificial neural networks for navigation. In 2018 IEEE/ION Position, Location and Navigation Symposium (PLANS), pp. 1351-1361. IEEE, 2018.

I. Dwivedi, S. Malla, B. Dariush, and C. Choi. Ssp: Single shot future trajectory prediction. arXiv preprint arXiv:2004.05846, 2020.

A. Graves. Generating sequences with recurrent neural networks. arXiv preprint arXiv: 1308.0850, 2014.

A. Gupta, J. Johnson, L. Fei-Fei, S. Savarese, and A. Alahi. Social gan: Socially acceptable trajectories with generative adversarial networks. In Proceedings of the IEEE Conference on Computer Vision and Pattern Recognition, pp. 2255-2264, 2018.

L. U. Hjorth and I. T. Nabney. Regularisation of mixture density networks. In 1999 Ninth International Conference on Artificial Neural Networks ICANN 99.(Conf. Publ. No. 470), vol. 2, pp. 521-526. IET, 1999.

Y. Huang, H. Bi, Z. Li, T. Mao, and Z. Wang. Stgat: Modeling spatial-temporal interactions for human trajectory prediction. In Proceedings of the IEEE International Conference on Computer Vision, pp. 6272-6281, 2019.

B. Ivanovic and M. Pavone. The trajectron: Probabilistic multi-agent trajectory modeling with dynamic spatiotemporal graphs. In Proceedings of the IEEE International Conference on Computer Vision, pp. 2375-2384, 2019.

T. N. Kipf and M. Welling. Semi-supervised classification with graph convolutional networks. arXiv preprint arXiv: 1609.02907, 2017.

V. Kosaraju, A. Sadeghian, R. Martín-Martín, I. Reid, H. Rezatofighi, and S. Savarese. Social-bigat: Multimodal trajectory forecasting using bicycle-gan and graph attention networks. In Advances in Neural Information Processing Systems, pp. 137-146, 2019.

N. Lee, W. Choi, P. Vernaza, C. B. Choy, p. H. Torr, and M. Chandraker. Desire: Distant future prediction in dynamic scenes with interacting agents. In Proceedings of the IEEE Conference on Computer Vision and Pattern Recognition, pp. 336-345, 2017.

A. Lerner, Y. Chrysanthou, and D. Lischinski, "Crowds by example," in Computer graphics forum, vol. 26, No. 3. Wiley Online Library, 2007, pp. 655-664.

Y. Ma, X. Zhu, S. Zhang, R. Yang, W. Wang, and D. Manocha. Trafficpredict: Trajectory prediction for heterogeneous traffic-agents. In Proceedings of the AAAI Conference on Artificial Intelligence, vol. 33, pp. 6120-6127, 2019.

O. Makansi, O. Cicek, K. Buchicchio, and T. Brox. Multimodal future localization and emergence prediction for objects in egocentric view with a reachability prior. InProceedings of the IEEE/CVF Conference on Computer Vision and Pattern Recognition, pp. 4354-4363, 2020.

O. Makansi, E. Ilg, O. Cicek, and T. Brox. Overcoming limitations of mixture density networks: A sampling and fitting framework for multimodal future prediction. In Proceedings of the IEEE Conference on Computer Vision and Pattern Recognition, pp. 7144-7153, 2019.

S. Malla and C. Choi. Nemo: Future object localization using noisy ego priors. arXiv preprint arXiv:1909.08150, 2020, I. Dwivedi, B, Dariush.

S.Malla, B.Dariush, and C. Choi. Titan: Future forecast using action priors. In Proceedings of the IEEE/CVF Conference on Computer Vision and Pattern Recognition, pp. 11186-11196, 2020.

E. Marchetti, F. Becattini, L. Seidenari, and A. D. Bimbo. Mantra: Memory augmented networks for multiple trajectory prediction. In Proceedings of the IEEE/CVF Conference on Computer Vision and Pattern Recognition, pp. 7143-7152, 2020.

S. Messaoud, D. Forsyth, and A. G. Schwing. Structural consistency and controllability for diverse colorization. In Proceedings of the European Conference on Computer Vision (ECCV), pp. 596-612, 2018.

A. Mohamed, K. Qian, M. Elhoseiny, and C. Claudel. Social-stgcnn: A social spatio-temporal graph convolutional neural network for human trajectory prediction. In Proceedings of the IEEE/CVF Conference on Computer Vision and Pattern Recognition, pp. 14424-14432, 2020.

S. Pellegrini, A. Ess, K. Schindler, and L. Van Gool, "You'll never walk alone: Modeling social behavior for multi-target tracking," in 2009 IEEE 12th International Conference on Computer Vision. IEEE, 2009, pp. 261-268.

T. Phan-Minh, E. C. Grigore, F. A. Boulton, O. Beijbom, and E. M. Wolff. Covernet: Multimodal behavior prediction using trajectory sets. In Proceedings of the IEEE/CVF Conference on Computer Vision and Pattern Recognition, pp. 14074-14083, 2020.

C. Rupprecht, I. Laina, R. DiPietro, M. Baust, F. Tombari, N. Navab, and G. D. Hager. Learning in an uncertain world: Representing ambiguity through multiple hypotheses. In Proceedings of the IEEE International Conference on Computer Vision, pp. 3591-3600, 2017.

A. Sadeghian, V. Kosaraju, A. Sadeghian, N. Hirose, H. Rezatofighi, and S. Savarese. Sophie: An attentive gan for predicting paths compliant to social and physical constraints. In Proceedings of the IEEE Conference on Computer Vision and Pattern Recognition, pp. 1349-1358, 2019.

L. A. Thiede and P. P. Brahma. Analyzing the variety loss in the context of probabilistic trajectory prediction. In Proceedings of the IEEE International Conference on Computer Vision, pp. 9954-9963, 2019.

A. Vaswani , N. Shazeer, N. Parmar, J. Uszkoreit, L. Jones, A. N. Gomez, L Kaiser, and I. Polosukhin. Attention is all you need. In Advances in neural information processing systems, pp. 5998-6008, 2017.

A. Vemula, K. Muelling, and J. Oh. Social attention: Modeling attention in human crowds. In 2018 IEEE international Conference on Robotics and Automation (ICRA), pp. 1-7. IEEE, 2018.

X. Wang, R. Girshick, A. Gupta, and K. He. Non-local neural networks. In Proceedings of the IEEE conference on computer vision and pattern recognition, pp. 7794-7803, 2018.

Y. Xu, Z. Piao, and S. Gao. Encoding crowd interaction with deep neural network for pedestrian trajectory prediction. In Proceedings of the IEEE Conference on Computer Vision and Pattern Recognition, pp. 5275-5284, 2018.

S. Yan, Y. Xiong, and D. Lin. Spatial temporal graph convolutional networks for skeleton-based action recognition. In Thirty-second AAAI conference on artificial intelligence, 2018.

P. Zhang, W. Ouyang, P. Zhang, J. Xue, and N. Zheng. Sr-lstm: State refinement for lstm towards pedestrian trajectory prediction. In Proceedings of the IEEE Conference on Computer Vision and Pattern Recognition, pp. 12085-12094, 2019.

C. Choi, A. Patil, and S. Malla. Drogon: A causal reasoning framework for future trajectory forecast. arXiv preprint arXiv: 1908.00024, 2019.

(56) References Cited

OTHER PUBLICATIONS

C. Choi, S. Malla, A. Patil, and J.H. Choi. Drogon: A Trajectory Prediction Model based on Intention-Conditioned Behavoir Reasoning. arXiv:1908.00024v3, Nov. 6, 2020.

* cited by examiner

SYSTEM AND METHOD FOR PROVIDING SOCIAL-STAGE SPATIO-TEMPORAL MULTI-MODAL FUTURE FORECASTING

CROSS-REFERENCE TO RELATED APPLICATION

This application claims priority to U.S. Provisional Application Ser. No. 63/053,394 filed on Jul. 17, 2020, which is expressly incorporated herein by reference.

BACKGROUND

Forecasting the trajectory of agents in dynamic scenes is an important research problem with a range of applications such as autonomous navigation, driver assistance systems, surveillance, human-robot interaction, crowd-simulation, and gaming/entertainment. The challenge in addressing this problem lies in modeling the variability and uncertainty of human behavior and the associated social and cultural norms. In many cases, existing methods lack complex path prediction particularly in scenes that are highly unsaturated and involve complex interactions between agents, or between agents and the environment.

BRIEF DESCRIPTION

According to one aspect, a computer-implemented method for providing social-stage spatio-temporal multi-modal future forecasting that includes receiving environment data associated with a surrounding environment of an ego vehicle. The computer-implemented method also includes implementing graph convolutions to obtain attention weights that are respectively associated with agents that are located within the surrounding environment. The computer-implemented method additionally includes decoding multi modal trajectories and probabilities for each of the agents. Predicted trajectories are determined for each of the agents and rankings associated with probabilities that are associated with each of the predicted trajectories are outputted. The computer-implemented method further includes controlling at least one vehicle system of the ego vehicle based on the predicted trajectories associated with each of the agents and the rankings associated with the probabilities.

According to another aspect, a system for providing social-stage spatio-temporal multi-modal future forecasting that includes a memory storing instructions when executed by a processor cause the processor to receive environment data associated with a surrounding environment of an ego vehicle. The instructions also cause the processor to implement graph convolutions to obtain attention weights that are respectively associated with agents that are located within the surrounding environment. The instructions additionally cause the processor to decode multi modal trajectories and probabilities for each of the agents. Predicted trajectories are determined for each of the agents and rankings associated with probabilities that are associated with each of the predicted trajectories are outputted. The instructions further cause the processor to control at least one vehicle system of the ego vehicle based on the predicted trajectories associated with each of the agents and the rankings associated with the probabilities.

According to yet another aspect, non-transitory computer readable storage medium storing instructions that when executed by a computer, which includes a processor perform a method that includes receiving environment data associated with a surrounding environment of an ego vehicle. The method also includes implementing graph convolutions to obtain attention weights that are respectively associated with agents that are located within the surrounding environment. The method additionally includes decoding multi modal trajectories and probabilities for each of the agents. Predicted trajectories are determined for each of the agents and rankings associated with probabilities that are associated with each of the predicted trajectories are outputted. The method further includes controlling at least one vehicle system of the ego vehicle based on the predicted trajectories associated with each of the agents and the rankings associated with the probabilities.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
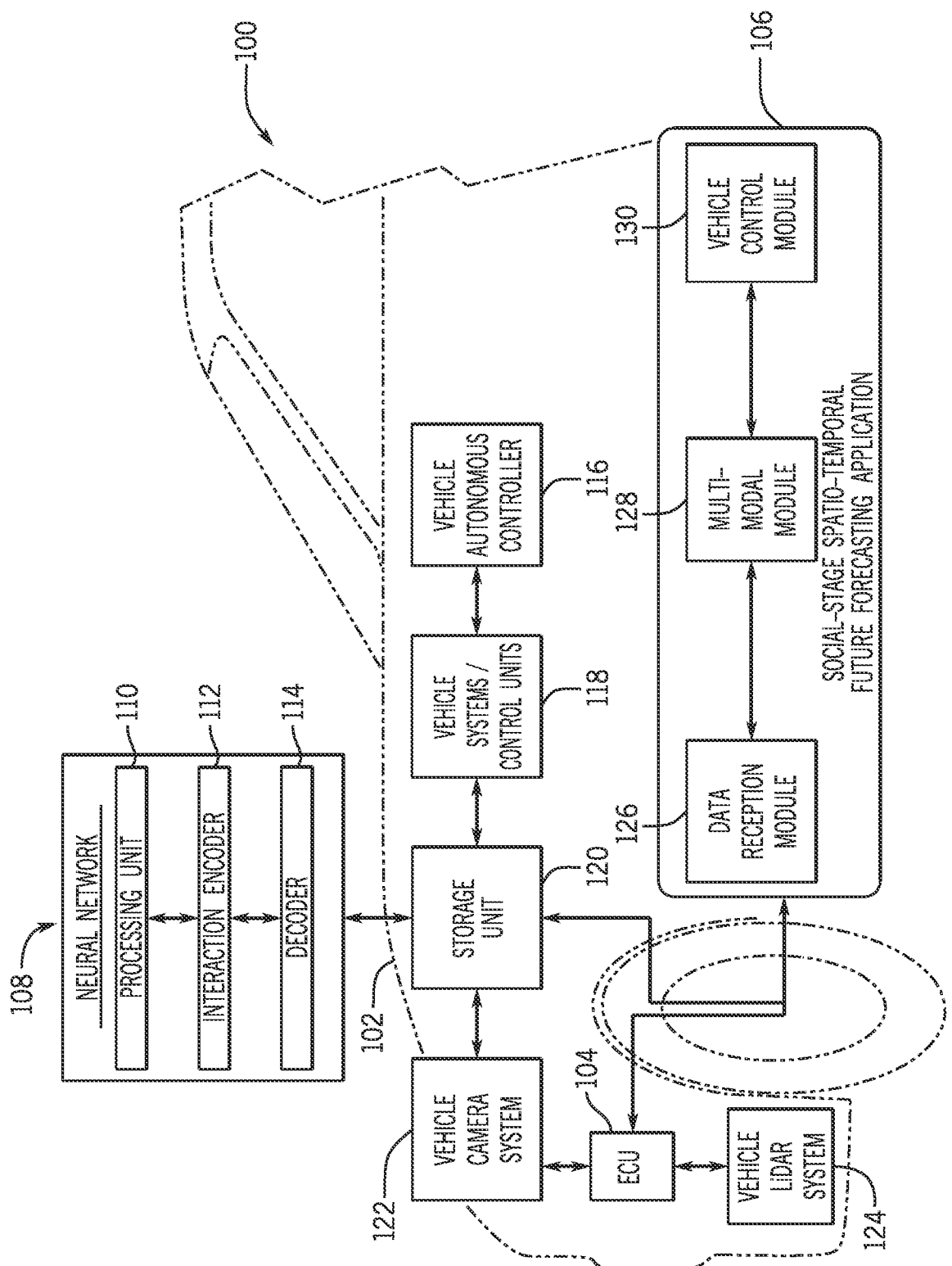
FIG. 1 is a schematic view of an exemplary operating environment for implementing systems and methods for completing social-stage spatio-temporal multi-modal future forecasting according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary operating environment 100 for implementing systems and methods for completing social-stage spatio-temporal multi-modal future forecasting according to an exemplary embodiment of the present disclosure. The components of the environment 100, as well as the components of other systems, hardware architectures, and software architectures discussed herein, may be combined, omitted, or organized into different architectures for various embodiments.

Generally the environment 100 includes an ego vehicle 102 with an electronic control unit (ECU) 104 that executes one or more applications, operating systems, ego vehicle system and subsystem user interfaces, among others. The ECU 104 may also execute a social-stage future forecasting application (social-stage application) 106 that may be configured to provide social-stage spatio-temporal multi-modal future forecasting of agents that may be in located within a surrounding environment of the ego vehicle 102.

Figure 2:
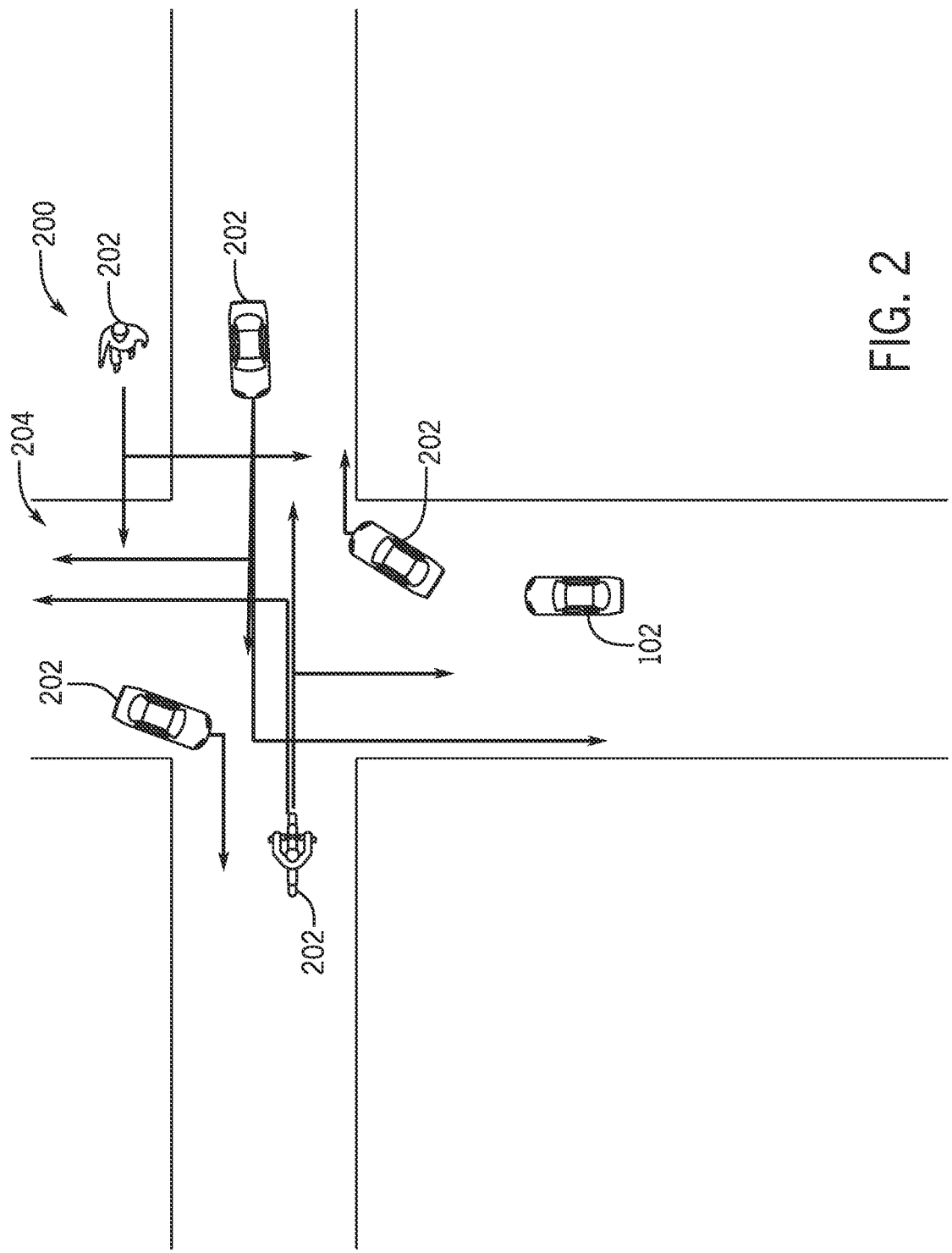
FIG. 2 is a schematic view of an exemplary operating environment for implementing systems and methods for completing social-stage spatio-temporal multi-modal future forecasting according to an exemplary embodiment of the present disclosure.

As shown in an illustrative example of FIG. 2, the surrounding environment 200 may include a predetermined distance/vicinity that is located around the ego vehicle 102.

In an exemplary embodiment, the ego vehicle 102 may include, but may not be limited to, a transportation vehicle (e.g., car, truck, bus, airplane, etc.), a robot, a motorized bicycle/scooter, an automated shopping cart, an automated suit case, a motorized wheel chair, and the like. However, for purposes of simplicity the above mentioned configurations may all be generally described as the ego vehicle 102 within this disclosure. The agents 202 may also include, but may not be limited to, additional transportation vehicles, pedestrians, robots, motorized bicycles/scooters, automated shopping carts, automated suit cases, motorized wheel chairs, and the like. The surrounding environment 200 may include one or more pathways 204 on which the ego vehicle 102 and the agents 202 may be traveling.

With continued reference to FIG. 1 and FIG. 2, as discussed in more detail below, the social-stage application 106 may be configured to utilize a neural network 108 to execute machine learning/deep learning processes to model social interactions between the ego vehicle 102 and the agents 202 that are located within the surrounding environment 200 of the ego vehicle 102. The neural network 108 may be configured as a graph convolutional network and may be executed by a processing unit 110. The processing unit 110 may be configured to provide processing capabilities to be configured to utilize machine learning/deep learning to provide artificial intelligence capabilities that may be executed to analyze inputted data and to output data to the social-stage application 106.

The neural network 108 may be configured to receive inputs associated with the motion history with respect to the trajectories of the agents 202 within the surrounding environment 200 of the ego vehicle 102. Given the observations of agents' motion history, the neural network 108 may be configured to explore the spatial influences of individual entities and their temporal changes, creating spatio-temporal interactions. As discussed below, the neural network 108 may be configured to utilize an interaction encoder 112 to encode meaningful interactions into encoded features. The interaction encoder 112 may be configured to execute a multi-attention function to highlight important interactions in space and in time that occur with respect to the agents 202 within the surrounding environment 200 of the ego vehicle 102.

The neural network 108 may additionally utilize a decoder 114 to decode the encoded features into multi-modal trajectories (represented in FIG. 2 by the exemplary arrows). The multi-modal trajectories may include a set of plausible deterministic trajectories that are respectively associated with each of the agents 202. The multi-modal trajectories may be outputted by the decoder 114 as predicted future trajectories of the agents 202. As discussed below, the predicted future trajectories may be output with corresponding probabilities that pertain to a likelihood that each respective agent 202 utilizes each respective predicted trajectory associated with that particular agent 202 in one or more future time steps. Multiple penalty terms may be used to diversify the prediction outputs and predict probabilities while preserving an accurate trajectory with respect to each agent 202 that is located within the surrounding environment 200 of the ego vehicle 102.

As discussed below, the neural network 108 may be configured to output the predicted trajectories associated with each of the agents 202 and rankings associated with each of the predicted trajectories that correspond to the corresponding probabilities to the social-stage application 106. The rankings may be associated with probabilities that each respective agent utilizes a predicted trajectory in one or more future time steps. In an exemplary embodiment, the predicted trajectories and the respective rakings may be output to the social-stage application 106 to be analyzed to operably control one or more systems of the ego vehicle 102.

In particular, the social-stage application 106 may be configured to analyze the predicted trajectories of the agents 202 that are located within the surrounding environment 200 of the ego vehicle 102 with respect to the highest ranked/ most probable predicted trajectories. In one embodiment, the social-stage application 106 may be configured to output instructions to communicate autonomous control parameters to a vehicle autonomous controller 116 of the ego vehicle 102 to autonomously control the ego vehicle 102 to avoid overlap with the respective predicted trajectories that are respectively associated with each of the agents 202 for projected trajectories that include probabilities that are ranked above a predetermined probability threshold at one or more future time steps (t+1, t+2, t+n).

In additional embodiments, the social-stage application 106 may be configured to output instructions to vehicle systems/control units 118. The vehicle systems/control units 118 may include driver assistance systems that may provide audio and/or visual alerts to an operator (not shown) (e.g., driver) of the ego vehicle 102 in one or more circumstances. In one embodiment, the social-stage application 106 may analyze the highest ranked/most probable predicted trajectories of the agents 202 that are located within the surrounding environment 200 of the ego vehicle 102 to determine one or more command instructions to be outputted to the vehicle systems/control units 118 to provide one or more alerts to the operator of the ego vehicle 102 to avoid overlap with the respective predicted trajectories that are ranked above a predetermined probability threshold of the agents 202 at one or more future time steps (t+1, t+2, t+n).

With continued reference to FIG. 1, in addition to the ECU 104, the vehicle autonomous controller 116 and the vehicle systems/control units 118, the ego vehicle 102 may also include a plurality of components that may include, but may not be limited to, a storage unit 120, a vehicle camera system 122, and a vehicle LiDAR system 124. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the ego vehicle 102.

The ECU 104 may also include a communication device (not shown) for sending data internally within (e.g., between one or more components) the ego vehicle 102 and communicating with externally hosted computing systems (e.g., external to the ego vehicle 102). Generally, the ECU 104 may communicate with the storage unit 120 to execute the one or more applications, operating systems, ego vehicle system and subsystem user interfaces, and the like that are stored within the storage unit 120. In one embodiment, the ECU 104 may communicate with the vehicle autonomous controller 116 to execute autonomous driving commands to operate the ego vehicle 102 to be fully autonomously driven or semi-autonomously driven in a particular manner. As discussed, the autonomous driving commands may be based on commands that may be communicated by the social-stage application 106.

In one or more embodiments, the vehicle autonomous controller 116 may autonomously control the operation of the ego vehicle 102 by providing one or more commands to one or more of the vehicle systems/control units 118 to provide full autonomous or semi-autonomous control of the ego vehicle 102. Such autonomous control of the ego vehicle 102 may be provided by sending one or more commands to control one or more of the vehicle systems/control units 118 to operate (e.g., drive) the ego vehicle 102 during one or more circumstances (e.g., when providing driver assist controls) and/or to fully control driving of the ego vehicle 102 during an entire trip of the ego vehicle 102. The one or more commands may be provided to one or more vehicle systems/control units 118 that include, but are not limited to an engine control unit, a braking control unit, a transmission control unit, a steering control unit, driver assistance systems, and the like to control the ego vehicle 102 to be autonomously driven and/or provide audio and/or visual alerts to an operator of the ego vehicle 102 in one or more circumstances.

In one or more embodiments, the storage unit 120 of the ego vehicle 102 may be configured to store one or more executable files associated with one or more operating systems, applications, associated operating system data, application data, ego vehicle system and subsystem user interface data, and the like that are executed by the ECU 104. In one or more embodiments, the storage unit 120 may be accessed by the social-stage application 106 to store data associated with predicted trajectories and associated rankings output to the application 106 by the neural network 108 to be further utilized to provide one or more commands to the vehicle autonomous controller 116 and/or the vehicle systems/control units 118.

With continued reference to FIG. 1, the vehicle camera system 122 may include one or more of the cameras (not shown) that may be positioned in one or more directions and at one or more areas to capture one or more images of the surrounding environment 200 of the ego vehicle 102 (e.g., images of the roadway on which the ego vehicle 102 is traveling). The one or more cameras of the vehicle camera system 122 may be disposed at external front portions of the ego vehicle 102, including, but not limited to different portions of the ego vehicle dashboard, ego vehicle bumper, ego vehicle front lighting units, ego vehicle fenders, and the windshield. In one embodiment, the one or more cameras may be configured as RGB cameras that may capture RGB bands that are configured to capture rich information about object appearance, as well as relationships and interactions between the ego vehicle 102 and objects within the surrounding environment 200 of the ego vehicle 102.

In other embodiments, the one or more cameras may be configured as stereoscopic cameras that are configured to capture environmental information in the form three-dimensional images. In one or more configurations, the one or more cameras may be configured to capture one or more first person viewpoint RGB images/videos of the surrounding environment 200 of the ego vehicle 102. The vehicle camera system 122 may be configured to convert one or more RGB images/videos (e.g., sequences of images) into image data that is communicated to the social-stage application 106 to be analyzed.

In an exemplary embodiment, the vehicle LiDAR system 124 may be operably connected to a plurality of LiDAR sensors (not shown). In particular, the vehicle LiDAR system 124 may include one or more planar sweep lasers that include respective three-dimensional LiDAR sensors that may be configured to oscillate and emit one or more laser beams of ultraviolet, visible, or near infrared light toward the scene of the surrounding environment 200 of the ego vehicle 102. The plurality of LiDAR sensors may be configured to receive one or more reflected laser waves (e.g., signals) that are reflected off one or more objects such as agents 202 that are located within the surrounding environment 200 of the ego vehicle 102. In other words, upon transmitting the one or more laser beams to the surrounding environment 200 of the ego vehicle 102, the one or more laser beams may be reflected as laser waves by one or more obstacles, static objects (e.g., traffic cones, lamp posts), and/or dynamic objects such as the agents 202 that may be located within the surrounding environment 200 of the ego vehicle 102 at one or more points in time.

In one embodiment, each of the plurality of LiDAR sensors may be configured to analyze the reflected laser waves and output respective LiDAR data to the social-stage application 106. The LiDAR data may include LiDAR coordinates that may be associated with the locations, positions, depths, and/or dimensions (e.g., measurements) of one or more dynamic objects such as the agents 202 that may be located within the surrounding environment 200 of the ego vehicle 102.

In one or more embodiments, image data provided by the vehicle camera system 122 and/or the LiDAR data provided by the vehicle LiDAR system 124 may be analyzed by the application 106 to determine a historic representation of past trajectory observations of agents 202 that are located within the surrounding environment 200 of the ego vehicle 102 for n time steps (t, t−2, t−2, t−n). As discussed below, the trajectory observations may be inputted to the neural network 108 to thereby perform ST-graph convolutions and to execute a multi-attention function for encoding meaningful interactions using the interaction encoder 112. The encoded features may be inputted to the decoder 114 to be decoded into multi-modal trajectories that are respectively associated with each of the agents 202 and corresponding probabilities that may be ranked for each mode.

Stated differently, based on the past trajectories determined by the analysis of image data provided by the vehicle camera system 122 and/or the LiDAR data provided by the vehicle LiDAR system 124, the social-stage application 106 may be configured to predict multi-modal trajectories of agents 202 that are located within the surrounding environment 200 of the ego vehicle 102 with rankings considering both motion and interactions using graph encoding and multi-attentions.

II. The Social-Stage Future Forecasting Application and Related Methods

Components of the social-stage application 106 will now be described according to an exemplary embodiment and with reference to FIG. 1. In an exemplary embodiment, the social-stage application 106 may be stored on the storage unit 120 and executed by the ECU 104 of the ego vehicle 102. In another embodiment, the social-stage application 106 may be stored on an externally hosted computing infrastructure (not shown) and may be accessed by a telematics control unit (not shown) of the ego vehicle 102 to be executed by the ECU 104 of the ego vehicle 102.

The general functionality of social-stage application 106 will now be discussed with continued reference to FIG. 1. In an exemplary embodiment, the social-stage application 106 may include a plurality of modules 126-130 that may be configured to provide social-stage spatio-temporal multi-modal future forecasting. The plurality of modules 126-130 may include a data reception module 126, a multi-modal module 128, and a vehicle control module 130. However, it is appreciated that the social-stage application 106 may include one or more additional modules and/or sub-modules that are included in lieu of the modules 124-128.

In an exemplary embodiment, the plurality of modules 126-130 may utilize the neural network 108 to predict the future trajectories of each of the agents 202 and rank the predicted trajectories based on probabilities that each respective agent utilizes a predicted trajectory in one or more future time steps. Accordingly, given the agents 202 K that are located within the surrounding environment 200 of the ego vehicle 102 and past trajectory observations $X^k = \{x_1^k, x_2^k, \ldots x_{T_{in}}^k\}$ for each agent 202 k∈K for $T_{in}$ time—steps, the social-stage application 106 may utilize the neural network 108 to predict the future trajectories as outputs.

The ground truth for each agent 202 in realistic datasets that are accessed by the neural network 108 is available as single trajectory $Y^k = \{y_1^k, y_2^k, \ldots y_{T_{out}}^k\}$ for $T_{out}$ time—steps. As discussed in more detail below, the neural network 108 may thereby be utilized to predict M modes of future trajectories as outputs $\wedge(m)k = \{\hat{y}_{(m)1}^k, \hat{y}_{(m)2}^k, \ldots y_{(m)T_{out}}^k\}$ for all K agents 202 in the scene, where m∈M. Additionally, the neural network 108 predicts probabilities $p_m^k$, for each agent 202 k and each mode m, such that 133 $\Sigma p_m^k = 1$ and ranks the predicted trajectories based on the predicted probabilities.

Figure 3:
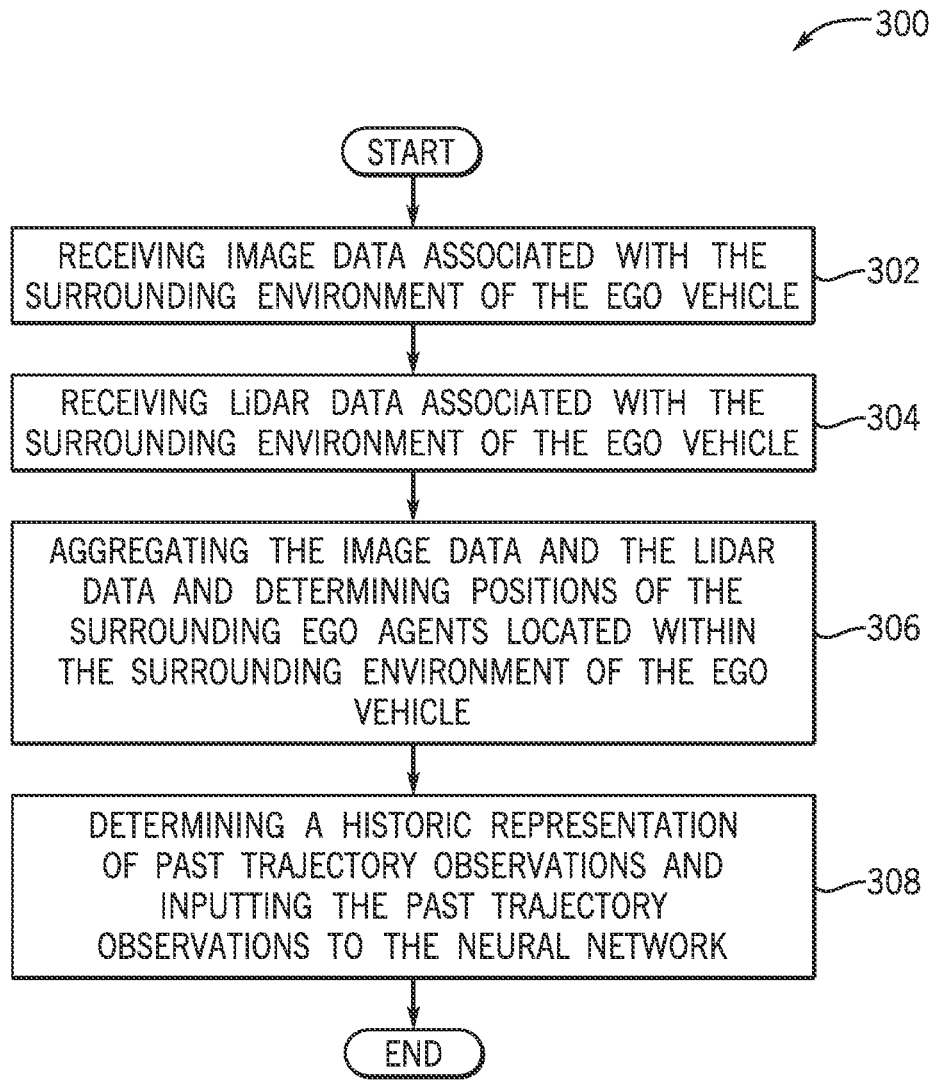
FIG. 3 is a process flow diagram of a method for determining a historic representation of past trajectory observations of agents located within q surrounding environment of the ego vehicle according to an exemplary embodiment of the present disclosure.

FIG. 3 is a process flow diagram of a method 300 for determining a historic representation of past trajectory observations of agents 202 located within the surrounding environment 200 of the ego vehicle 102 according to an exemplary embodiment of the present disclosure. FIG. 3 will be described with reference to the components of FIG. 1 though it is to be appreciated that the method 300 of FIG. 3 may be used with other systems/components. The method 300 may begin at block 302, wherein the method 300 may include receiving image data associated with the surrounding environment 200 of the ego vehicle 102.

In an exemplary embodiment, the data reception module 126 may be configured to receive environmental data that may be associated with the surrounding environment 200 of the ego vehicle 102 in the form of image data that may be provided by the vehicle camera system 122 of the ego vehicle 102 at a plurality of time steps. The image data may pertain to a plurality of images/video of the surrounding vehicles that are located within the surrounding environment 200 of the ego vehicle 102 that are captured by one or more cameras that are operably connected to the vehicle camera system 122.

The method 300 may proceed to block 304, wherein the method 300 may include receiving LiDAR data associated with the surrounding environment 200 of the ego vehicle 102. In an exemplary embodiment, the data reception module 126 may be configured to receive the environmental data in the form of LiDAR data that may be provided by the vehicle LiDAR system 124 and may be associated with the one or more reflected laser waves. In one embodiment, the LiDAR data may include LiDAR based observations associated with surrounding vehicles that may be located within the surrounding environment 200 of the ego vehicle 102 at a plurality of simultaneous time steps at which the plurality of images/video of the agents 202 that are located within the surrounding environment 200 of the ego vehicle 102 are captured.

The method 300 may proceed to block 306, wherein the method 300 may include aggregating the image data and the LiDAR data and detecting and tracking the agents 202 included within the surrounding environment 200 of the ego vehicle 102. In an exemplary embodiment, the data reception module 126 may be configured to analyze the image data and the LiDAR data to determine data points that correspond to respective agents 202 that are located within the surrounding environment 200 of the ego vehicle 102. Such corresponding data points may be based on one or more cameras and one or more LiDAR sensors that may be disposed at one or more corresponding portions of the ego vehicle 102, one or more cameras and one or more LiDAR sensors that may be capturing data associated with one or more consistent directions associated with the surrounding environment 200 of the ego vehicle 102, and/or one or more agents 202 that may be included within captured data points within the image data and the LiDAR data at one or more simultaneous time steps.

In one embodiment, the data reception module 126 may be configured to analyze the aggregated image LiDAR data captured during a plurality of time steps using stored image LiDAR logic to detect each of the agents 202 that are located within the surrounding environment 200 of the ego vehicle 102. Upon the detection of each of the agents 202 that are located within the surrounding environment 200 of the ego vehicle 102, the data reception module 126 may be configured to execute spatio-temporal tracking of each of the agents 202 during a plurality of time steps to track the positions of each of the agents 202 that are located within the surrounding environment 200 during the plurality of time steps.

The method 300 may proceed to block 308, wherein the method 300 may include determining a historic representation of past trajectory observations and inputting the past trajectory observations to the neural network 108. In an exemplary embodiment, upon detecting and tracking the agents 202 during the plurality of time steps, the data reception module 126 may be configured to aggregate the tracked positions of each of the agents 202 into past trajectories that may be associated with each of the agents 202. The past trajectories may include tracked positions of each of the agents 202 for n time steps (t−n, t−2, t−1, t) to determine a historic representation of past trajectory observations of the agents 202 that are located within the surrounding environment 200 of the ego vehicle 102.

Figure 5:
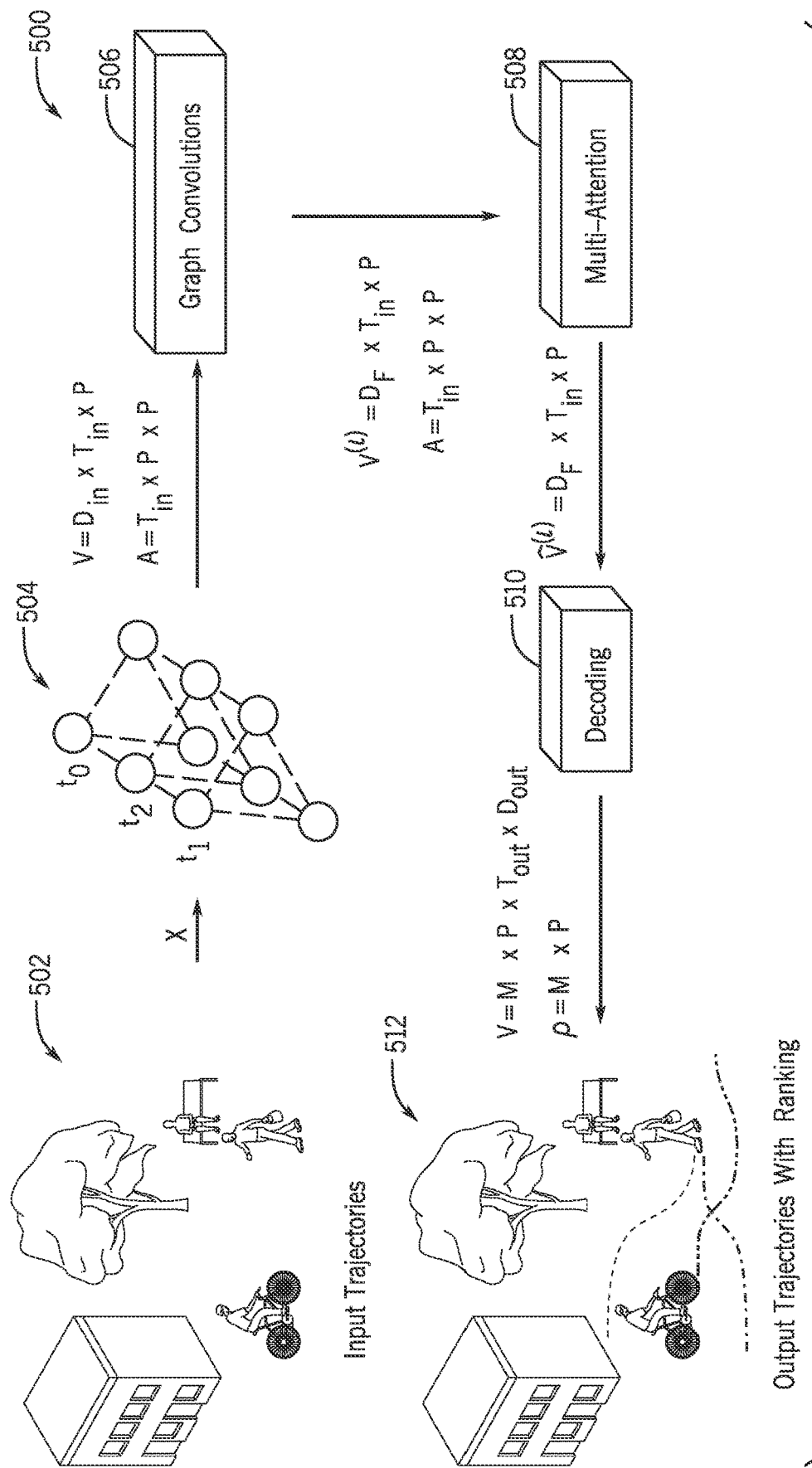
FIG. 5 is a schematic overview of a methodology executed by a social-stage application according to an exemplary embodiment of the present disclosure.

In an exemplary embodiment, the data reception module 126 may communicate data pertaining to the historic representation of the past trajectory observations of the agents to the multi-modal module 128 of the social-stage application 106. With reference to FIG. 5, a schematic overview of a methodology 500 executed by the social-stage application 106, the multi-modal module 128 may be configured to communicate with the neural network 108 to input the past trajectories 502 of each of the agents to the neural network 108.

Figure 4:
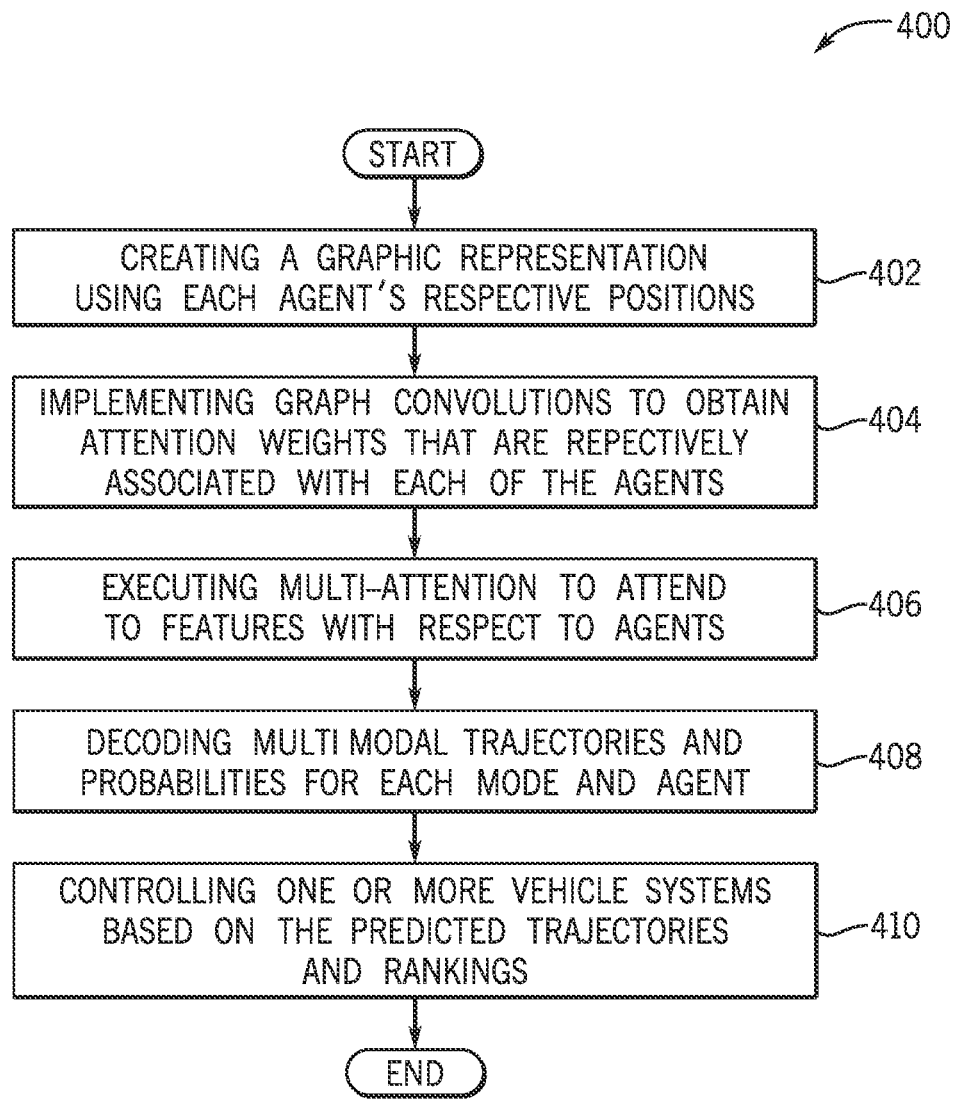
FIG. 4 is a process flow diagram of a method for predicting trajectories and probability rankings associated with the predicted trajectories that are associated with each of the agents that are located within the surrounding environment of the ego vehicle according to an exemplary embodiment of the present disclosure.

FIG. 4 is a process flow diagram of a method 400 for predicting trajectories and probability rankings associated with the predicted trajectories that are associated with each of the agents 202 that are located within the surrounding environment 200 of the ego vehicle 102 according to an exemplary embodiment of the present disclosure. FIG. 4 will be described with reference to the components of FIG. 1 though it is to be appreciated that the method 400 of FIG. 4 may be used with other systems/components. The method 400 may begin at block 402, wherein the method 400 may include creating a graphical representation using each agent's respective positions.

Referring again to FIG. 5, upon inputting the past trajectories 502 of each of the agents 202 to the neural network 108, the neural network 108 may create the graphic representation of the historic positions of the agents 202 by processing a spatio-temporal graph 504. In particular, the neural network 108 may create a graphical representation using all of the agents' positions $x_t$ at each time step t, $G_t=(E_t, V_t)$ where $E_t$ is edges and $V_t$ is vertices. Edges are also represented using a weighted matrix called an adjacency matrix $A_t$. A representation of relative motion to represent a node/vertex may include: $v_t^k = \|x_t^k - x_{t1}^k\|_2$ for agent k. Using this information, the adjacency matrix may be created for each element in adjacency matrix $a_t^{ij} = 1/\|v_t^i - v_t^j\|_2$, where i, j are different agents, for same agents $a^{ii}=0$ z.

The adjacency matrices from the input time steps A (each of the plurality of time steps) and vertices V of the spatio-temporal graph 504 that may be associated with the historic positions of the agents 202 may be output based on the spatio-temporal graph 504. Accordingly, the neural network 108 may predict the future motion of each of the agents 202 as a relative displacement of each time step similar to the input representation of each vertex and the absolute trajectories are reconstructed for evaluation and visualization purposes. In an exemplary embodiment, the output from the spatio-temporal graph 504 may be represented as: $V=D_{in} \times T_{in} \times P$, $A=T_{in} \times P \times P$ where $D_{in}$ is the input dimension of the trajectory at each time step. In one configuration, the pre-trained dataset may include 2D motion of agents such that $D_{in}=2$. $D_{out}$ is the output dimension of the trajectory, if the prediction is Gaussian distribution for each mode (Gaussian mixture) $D_{out}$ may be 5 (containing variance and correlation outputs), if the prediction is a direct trajectory, the regression $D_{out}$ may be 2.

Referring again to the method 400 of FIG. 4, upon creation of the graphic representation using each agent's position, the method 400 may proceed to block 404, wherein the method 400 may include implementing graph convolutions to obtain attention weights that are respectively associated with each of the agents. As shown in FIG. 5, the outputs from the spatio-temporal graph 504 may be inputted to graph convolutions 506. In one configuration, the adjacency matrices from all input time steps={$A_1, A_{T_{in}}$} and vertices V={$V_1, V_{T_{in}}$} may be stacked. At each time step the adjacency matrix may be normalized symmetrically as $A_t = \wedge_t^{-1/2} \hat{A}_t \wedge_t^{1/2}$. $\wedge_t$ matrix is diagonal node degree of $A_t$. $\hat{A}$ is stack of $\hat{A}_t(\hat{A}_t = A_t + I)$ and $\wedge$ is stack of 155 $\wedge_t$. At each layer l with the trainable weights $W^{(l)}$, the edge features $V^{(l)}$ are updated as shown in Equation 1 using the Adjacency matrix.

$$f(V^{(l)}, A) = \Gamma(\wedge^{-1/2} \hat{A} \wedge^{-1/2} V^{(l)} W^{(l)}) \quad (1)$$

The neural network 108 may use temporal convolutions with a particular kernel size (e.g., kernel size of 3) and a soft-max operation across a temporal dimension to obtain attention weights φ (V(l)). In one embodiment, outputs from the graph convolutions 506 may include $V^{(l)}=D_{in} \times T_{in} \times P$, $A=T_{in} \times P \times P$.

Figure 6A:
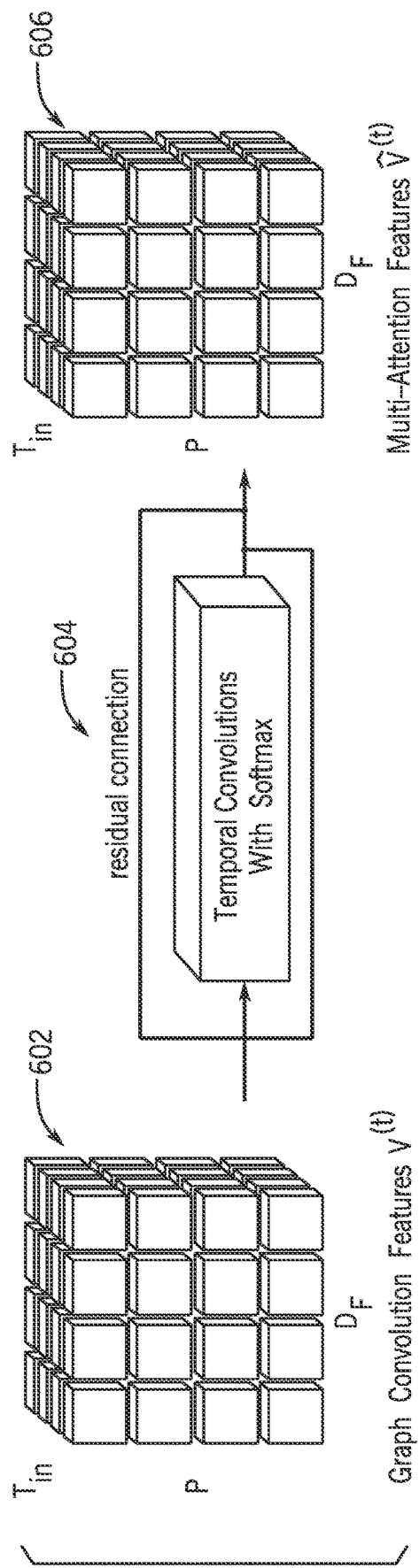
FIG. 6A is a schematic overview of a methodology executed by an interaction encoder of a neural network according to an exemplary embodiment of the present disclosure.

Referring again to the method 400 of FIG. 4, upon implementing the graph convolutions to obtain the attention weights, the method 400 may proceed to block 406, wherein the method 400 may include executing multi-attention to attend to features with respect to the agents 202. Referring again to FIG. 5 and FIG. 6A, the multi-attention function 508 may be executed by the interaction encoder 112 of the neural network 108. In one configuration, the interaction encoder 112 may use temporal convolutions 604 on the graph convolutions 602 $V^{(l)}$ on all of the agents 202 that are located within the surrounding environment 200 of the ego vehicle 102 that are output based on the graph convolutions 602 $V^{(l)}$. The interaction encoder 112 may utilize multi-attention as multiple agents 202 may have more attentive weights at a time step and may thereby output the multi-attention features 606 associated with the agents 202.

The neural network 108 may utilize the interaction encoder 112 to execute a multi-attention operation represented by the following equation:

$$\hat{V}^{(l)} = (\mathcal{K}(V^{(l)}) \otimes V^{(l)}) \oplus V^{(l)} \quad (2)$$

The interaction encoder 112 may perform interaction encoding to attend to useful features by executing the multi-attention function to highlight important interactions in space and in time. In one configuration, the interaction encoder 112 may be configured to predict attention weights using convolution options with a soft-max function on feature matrix $V^{(l)}$ at layer l. In some embodiments, the interaction encoder 112 may use a residual connection within the multi-attention mechanism using a multiReject attention operation: $\hat{V}^{(l)} = \phi(V^{(l)}) = V^{(l)} + V^{(l)}$. Accordingly, the interaction encoder 112 may encode features for each of the agents 202 and may parse the features with respect to space and time. The interaction encoder 112 may thereby output multi-attention features as: $\hat{V}^{(l)} = D_F \times T_{in} \times P$.

Figure 6B:
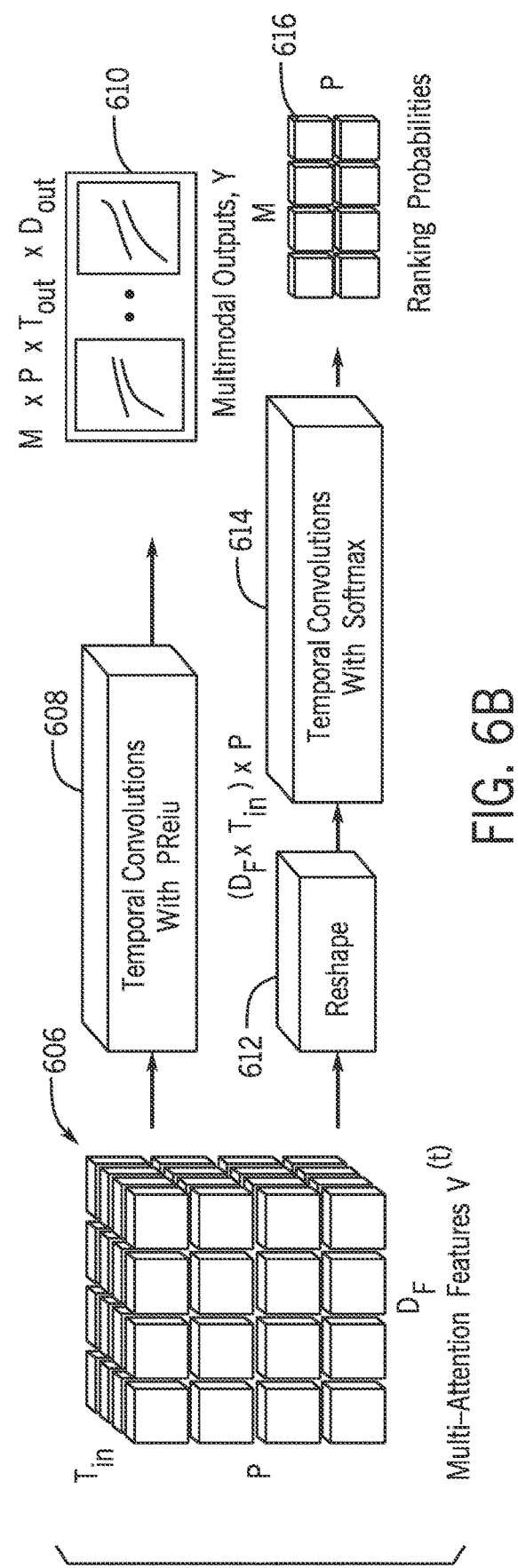
FIG. 6B is a schematic overview of a methodology executed by a decoder of the neural network according to an exemplary embodiment of the present disclosure.

Referring again to the method 400 of FIG. 4, upon executing the multi-attention function 508, the method 400 may proceed to block 408, wherein the method 400 may include decoding multi-modal trajectories and probabilities for each mode and agent 202. In an exemplary embodiment, the multi-attention features $\hat{V}^{(l)}$ that are output by the interaction encoder 112 may be fed to the decoder 114 of the neural network 108. Referring to FIG. 5 and FIG. 6B, the decoder 114 may perform decoding 510 of the inputted multi-attention features $\hat{V}^{(l)}$. In one configuration, the decoder 114 is configured to decode the multi-attention features 606 to output multi-modal trajectories and probability for each mode and each agent 202 that is located within the surrounding environment 200 of the ego vehicle 102.

The decoder 114 may be configured to use temporal convolutions with a PRelu operation 608 for trajectory regression to match the output trajectory time steps $T_{out}$. Accordingly, the decoder 114 may output multiple predicted trajectories 610 that may respectively be associated with each of the agents 202 that are located within the surrounding environment 200 of the ego vehicle 102. In one embodiment, probability prediction may be completed with a soft-max operation across modes dimension where the dimensions $T_{in}$ and $D_F$ may be merged. The multiple predicted trajectories may be output as multimodal outputs, Y, as $M \times P \times T_{out} \times D_{out}$ as decided multi-modal trajectories for each mode and agent 202. In one configuration, the outputs (future positions) $Y^k = \{y_1^k, y_k^2, y_T^{k_{out}}\}$ are predicted for all the agents 202 k in the scene that includes the surrounding environment 200 of the ego vehicle 102.

The decoder 114 may additionally be configured to decode probabilities for each output mode by reshaping the tensor 612 by combining first two dimensions ($D_F, T_{in}$) based on the multi-attention features $\hat{V}^{(l)}$ outputted by the multi-attention function 508. The reshaped tensors ($D_F$, $T_{in} \times P$) may be combined to perform convolutions on the combined dimensions with a soft-max operation 614 across output modes dimensions. A total loss is:

$$L = L_{ce} + L_{reg}^{min} \quad (3)$$

where $L_{ce}$ is cross entropy loss for ranking the modes by predicting the probabilities and $L_{reg}^{min}$ is the regression loss for predicting the trajectories.

In an exemplary embodiment, there may be ground truth trajectory per agent 202. Accordingly, the decoder 114 may use $L_{reg}^{min}$ for penalizing multi-modal outputs. In particular, the minimum error mode of all output modes $L_{reg}^{min}$ may be penalized to preserve multi-modality for all agents 202, as represented per the equation:

$$L_{reg}^{min} = \Sigma_k L_{reg}(Y_{m_{min}}^k), m_{min} = \arg\min_m L_{reg}(Y_m^k) L_{reg}$$
$$(Y_m^k) = \|Y^k - \hat{Y}_m^k\|_2 \quad (4)$$

where $m_{min}$ is the minimum error mode, $Y^k$ is the ground truth future trajectory and $\hat{Y}_m^k$ is a prediction mode (m) of agent 202 $k$.

In one configuration, with respect to the ranking of modes, the decoder 114 may penalize them in an unsupervised manner as represented by the equation:

$$L_{ce} = \sum_k \sum_i ce(p_{gt}^{k,m}, p_{pred}^{k,m}), \ p_{gt}^{k,m} = \begin{cases} 1, & m = m_{min} \\ 0, & \text{otherwise} \end{cases} \quad (5)$$

where $p_{gt}^{k,m}$ is ground—truth probability and $p_{pred}^{k,m}$ is prediction probability for mode m of agent 202 $k$. $p_{gt}^{k,m}$ is generated using the minimum error criteria, where the ground truth probability of each prediction mode is based on whether it is close the ground truth trajectory or not and ce is cross entropy loss.

Accordingly, the decoder 114 may thereby output the plurality of predicated trajectories 616 that are associated with each of the agents 202 that are located within the surrounding environment 200 of the ego vehicle 102 in addition to the rankings pertaining to the probabilities of usage and overlap with respect to the travel path of the ego vehicle 102. As shown in FIG. 5, the neural network 108 may be configured to output the plurality of predicated trajectories with the rankings 512 pertaining to the probabilities to the multi-modal module 128 of the social-stage application 106. The multi-modal module 128 may thereby analyze the predicted multi-modal trajectories with a respective ranking 512 that have been output based on the consideration of both the motion and interactions using graph encoding and multi-attentions and may communicate respective data pertaining to the predicted multi-modal trajectories and respective rankings to the vehicle control module 130 of the social-stage application 106.

Referring again to the method 400 of FIG. 4, upon outputting the multi-modal trajectories with ranking 512 (based on the executed of block 408), the method 400 may proceed to block 410, wherein the method 400 may include controlling one or more vehicle systems based on the predicted trajectories and rankings. In one embodiment, upon receipt of the communication of the predicted multi-modal trajectories and respective rankings from the multi-modal module 128, the vehicle control module 130 may be configured to compare the rankings associated with each of the predicted trajectories against a predetermined probability threshold to determine predicted trajectories that may be ranked higher than the predetermined probability threshold.

The predetermined probability threshold may be a dynamic threshold that may be associated with one or more features of the surrounding environment 200 of the ego vehicle 102 such as roadways, static objects, dynamic objects, lanes, etc., the position of the ego vehicle 102 with respect to the agents, and/or the travel path of the ego vehicle 102. The predetermined probability threshold may be configured as a threshold at which the ranking of predicted trajectories may be associated with a particular probability of overlap between the predicted travel paths and the travel path of the ego vehicle 102. In other words, the predetermined probability threshold may change based on the features of the surrounding environment 200 of the ego vehicle 102, the position of the ego vehicle 102 with respect to the agents, and/or the travel path of the ego vehicle 102 to determine one or more projected trajectories that may have a particular likelihood of usage and probability of overlap with respect to the travel path of the ego vehicle 102.

As such, the vehicle control module 130 may be configured to output instructions to communicate the autonomous control parameters to the vehicle autonomous controller 116 of the ego vehicle 102 to autonomously control the ego vehicle 102 to avoid overlap with the respective predicted trajectories that are ranked above a predetermined probability threshold of the agents 202 at one or more future time steps (t+1, t+2, t+n). In additional embodiments, the vehicle control module 130 may be configured to output instructions to vehicle systems/control units 118 to provide one or more alerts to the operator of the ego vehicle 102 to avoid overlap with the respective predicted trajectories that are ranked above a predetermined probability threshold of the agents at one or more future time steps (t+1, t+2, t+n).

Figure 7:
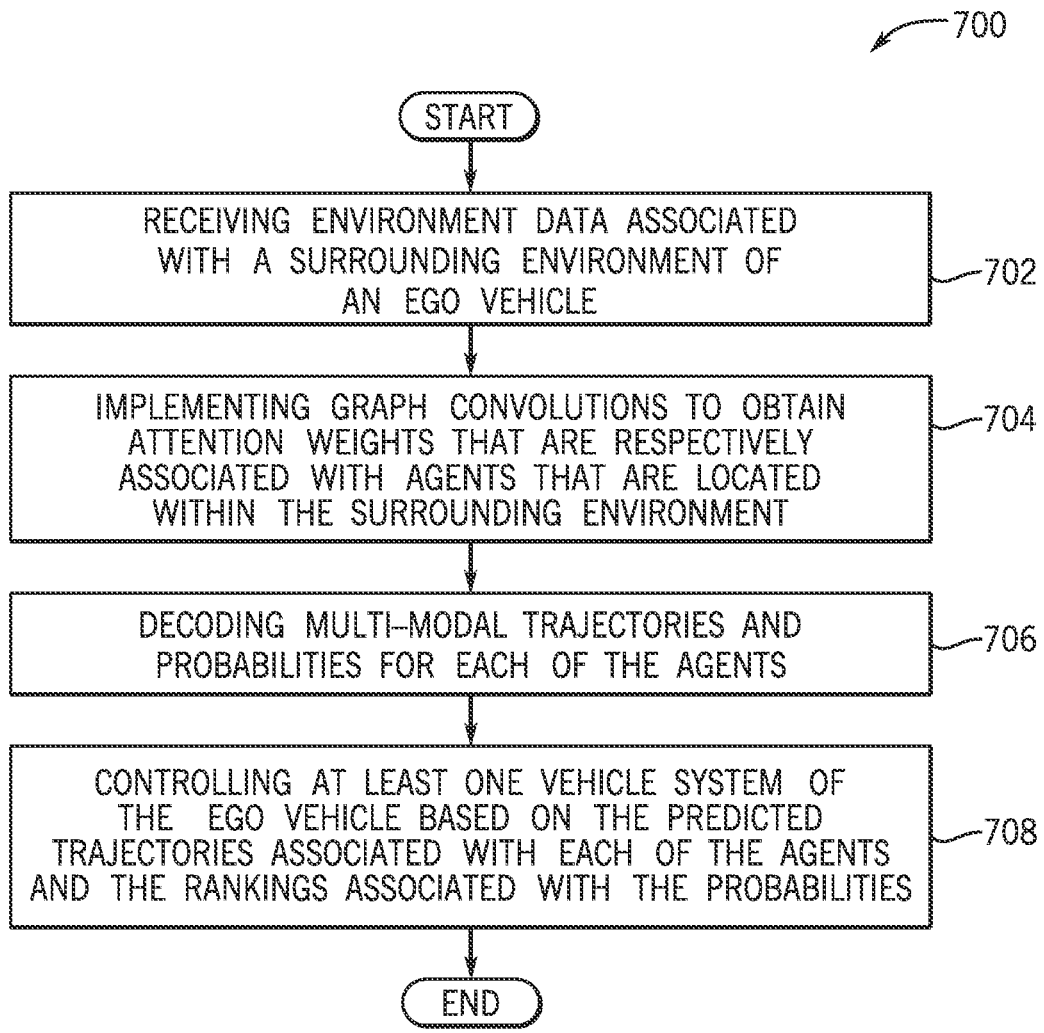
FIG. 7 is a process flow diagram of a method for completing social-stage spatio-temporal multi-modal future forecasting according to an exemplary embodiment of the present disclosure.

FIG. 7 is a process flow diagram of a method 700 for completing social-stage spatio-temporal multi-modal future forecasting according to an exemplary embodiment of the present disclosure. FIG. 7 will be described with reference to the components of FIG. 1 though it is to be appreciated that the method 700 of FIG. 7 may be used with other systems/components. The method 700 may begin at block 702, wherein the method 700 includes receiving environment data associated with a surrounding environment 200 of an ego vehicle 102.

The method 700 may proceed to block 704, wherein the method 700 may include implementing graph convolutions to obtain attention weights that are respectively associated with each of the agents 202. The method 700 may proceed to block 706, wherein the method 700 may include decoding multi modal trajectories and probabilities for each of the agents 202.

The method 700 may proceed to block 708, wherein the method 700 may include outputting predicted trajectories associated with each of the agents 202 and rankings associated with each of the predicted trajectories. In one embodiment, at least one vehicle system of the ego vehicle 102 is controlled based on the predicted trajectories associated with each of the agents 202 and the rankings associated with each of the predicted trajectories.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing social-stage spatio-temporal multi-modal future forecasting comprising:
receiving environment data including one or more features associated with a surrounding environment of an ego vehicle, the one or more features including at least roadways, static objects and dynamic agents;
implementing graph convolutions to obtain attention weights that are respectively associated with the agents that are located within the surrounding environment;
decoding multi modal trajectories and probabilities for each of the agents based on the attention weights for each agent as input, wherein predicted trajectories are determined for each of the agents and rankings associated with probabilities of usage and overlap that are associated with each of the predicted trajectories with respect to a travel path of the ego vehicle are outputted; and
controlling at least one vehicle system of the ego vehicle based on the predicted trajectories associated with each of the agents and the rankings associated with the probabilities,
wherein controlling the at least one vehicle system of the ego vehicle includes comparing the rankings associated with the probabilities to determine if the rankings are ranked higher than a predetermined probability threshold, wherein the predetermined probability threshold is a dynamic threshold associated with the features of the surrounding environment, the position of the ego vehicle with respect to the agents, the travel path of the ego vehicle, and the probabilities of overlap between the projected trajectories and the travel path of the ego vehicle,
wherein autonomous control parameters are output to autonomously control the ego vehicle within the surrounding environment of the ego vehicle based on the predicted trajectories associated with each of the agents and the rankings associated with the probabilities.

2. The computer-implemented method of claim 1, wherein receiving the environment data associated with the surrounding environment includes receiving images and LiDAR measurements captured of the agents that are located within the surrounding environment of the ego vehicle at a plurality of time steps.

3. The computer-implemented method of claim 2, wherein receiving the environment data associated with the surrounding environment includes aggregating image data and LiDAR data associated with the images and LiDAR measurements captured of the agents at the plurality of time steps, wherein historic positions of the agents during the plurality of time steps are determined based on aggregated image data and LiDAR data.

4. The computer-implemented method of claim 3, further including processing a spatio-temporal graph as a graphic representation of the historic positions of the agents at each time step of the plurality of time steps, wherein adjacency matrices from the plurality of time steps and graph vertices associated with the historic positions of the agents are output.

5. The computer-implemented method of claim 4, wherein implementing the graph convolutions to obtain the attention weights includes inputting the adjacency matrices from the plurality of time steps and the graph vertices associated with the historic positions of the agents to graph convolutions to obtain the attention weights that are respectively associated with each of the agents.

6. The computer-implemented method of claim 5, further including executing a multi-attention function to attend to features that are associated with the agents, wherein an encoding function is completed to encode and output features that are associated with the attention weights that are respectively associated with each of the agents.

7. The computer-implemented method of claim 6, wherein decoding the multi modal trajectories and the probabilities for each of the agents includes decoding the features to decode and output multiple predicted trajectories as multi-modal trajectories for each mode and agent.

8. The computer-implemented method of claim 7, wherein decoding the multi modal trajectories and the probabilities for each of the agents includes utilizing a cross entropy loss for ranking modes by predicting the probabilities and outputting the predicted trajectories with the rankings associated with probabilities.

9. A system for providing social-stage spatio-temporal multi-modal future forecasting comprising:
a memory storing instructions when executed by a processor cause the processor to:
receive environment data including one or more features associated with a surrounding environment of an ego vehicle, the one or more features including at least roadways, static objects and dynamic agents;
implement graph convolutions to obtain attention weights that are respectively associated with the agents that are located within the surrounding environment;
decode multi modal trajectories and probabilities for each of the agents based on the attention weights for each agent as input, wherein predicted trajectories are determined for each of the agents and rankings associated with probabilities of usage and overlap that are associated with each of the predicted trajectories with respect to a travel path of the ego vehicle are outputted; and
control at least one vehicle system of the ego vehicle based on the predicted trajectories associated with each of the agents and the rankings associated with the probabilities,
wherein controlling the at least one vehicle system of the ego vehicle includes comparing the rankings associated with the probabilities to determine if the rankings are ranked higher than a predetermined probability threshold, wherein the predetermined probability threshold is a dynamic threshold associated with the features of the surrounding environment, the position of the ego vehicle with respect to the agents, the travel path of the ego vehicle, and the probabilities of overlap between the projected trajectories and the travel path of the ego vehicle,
wherein autonomous control parameters are output to autonomously control the ego vehicle within the surrounding environment of the ego vehicle based on the predicted trajectories associated with each of the agents and the rankings associated with the probabilities.

10. The system of claim 9, wherein receiving the environment data associated with the surrounding environment includes receiving images and LiDAR measurements captured of the agents that are located within the surrounding environment of the ego vehicle at a plurality of time steps.

11. The system of claim 10, wherein receiving the environment data associated with the surrounding environment includes aggregating image data and LiDAR data associated with the images and LiDAR measurements captured of the agents at the plurality of time steps, wherein historic positions of the agents during the plurality of time steps are determined based on aggregated image data and LiDAR data.

12. The system of claim 11, further including processing a spatio-temporal graph as a graphic representation of the historic positions of the agents at each time step of the plurality of time steps, wherein adjacency matrices from the plurality of time steps and graph vertices associated with the historic positions of the agents are output.

13. The system of claim 12, wherein implementing the graph convolutions to obtain the attention weights includes inputting the adjacency matrices from the plurality of time steps and the graph vertices associated with the historic positions of the agents to graph convolutions to obtain the attention weights that are respectively associated with each of the agents.

14. The system of claim 13, further including executing a multi-attention function to attend to features that are associated with the agents, wherein an encoding function is completed to encode and output features that are associated with the attention weights that are respectively associated with each of the agents.

15. The system of claim 14, wherein decoding the multi modal trajectories and the probabilities for each of the agents includes decoding the features to decode and output multiple predicted trajectories as multi-modal trajectories for each mode and agent.

16. The system of claim 15, wherein decoding the multi modal trajectories and the probabilities for each of the agents includes utilizing a cross entropy loss for ranking modes by predicting the probabilities and outputting the predicted trajectories with the rankings associated with probabilities.

17. A non-transitory computer readable storage medium storing instructions that when executed by a computer, which includes a processor, perform a method, the method comprising:
receiving environment data including one or more features associated with a surrounding environment of an ego vehicle, the one or more features including at least roadways, static objects and dynamic agents;
implementing graph convolutions to obtain attention weights that are respectively associated with agents that are located within the surrounding environment;
decoding multi modal trajectories and probabilities for each of the agents based on the attention weights for each agent as input, wherein predicted trajectories are determined for each of the agents and rankings associated with probabilities of usage and overlap that are associated with each of the predicted trajectories with respect to a travel path of the ego vehicle are outputted; and
controlling at least one vehicle system of the ego vehicle based on the predicted trajectories associated with each of the agents and the rankings associated with the probabilities,
wherein controlling the at least one vehicle system of the ego vehicle includes comparing the rankings associated with the probabilities to determine if the rankings are ranked higher than a predetermined probability threshold, wherein the predetermined probability threshold is a dynamic threshold associated with the features of the surrounding environment, the position of the ego vehicle with respect to the agents, the travel path of the ego vehicle, and the probabilities of overlap between the projected trajectories and the travel path of the ego vehicle,
wherein autonomous control parameters are output to autonomously control the ego vehicle within the surrounding environment of the ego vehicle based on the predicted trajectories associated with each of the agents and the rankings associated with the probabilities.

* * * * *